(12) United States Patent
Li (10) Patent No.: US 9,958,257 B2
(45) Date of Patent: May 1, 2018

(54) INCREASING DYNAMIC RANGE OF A HEIGHT SENSOR FOR INSPECTION AND METROLOGY

(71) Applicant: KLA-Tencor Corporation, Milpitas, CA (US)

(72) Inventor: Shifang Li, Pleasanton, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days. days.

(21) Appl. No.: 15/269,892

(22) Filed: Sep. 19, 2016

(65) Prior Publication Data

US 2017/0082424 A1 Mar. 23, 2017

Related U.S. Application Data

(60) Provisional application No. 62/221,596, filed on Sep. 21, 2015.

(51) Int. Cl.
| | | |
|---|---|---|
| *G01B 11/28* | (2006.01) | |
| *G01B 11/06* | (2006.01) | |
| *G02B 27/00* | (2006.01) | |
| *G02B 21/00* | (2006.01) | |

(52) U.S. Cl.
CPC ...... *G01B 11/0608* (2013.01); *G02B 21/0032* (2013.01); *G02B 21/0096* (2013.01); *G02B 27/0025* (2013.01); *G01B 2210/56* (2013.01)

(58) Field of Classification Search
CPC . G01B 11/0625; G01B 11/0683; G01B 11/06; B24B 37/013; B24B 49/12
USPC .......................................................... 356/630
See application file for complete search history.

(56) References Cited

U.S. PATENT DOCUMENTS

| | | | | |
|---|---|---|---|---|
| 5,061,854 A | * | 10/1991 | Kroutil | G01J 3/4535 250/338.5 |
| 5,864,394 A | | 1/1999 | Jordan, III et al. | |
| 5,999,266 A | | 12/1999 | Takahashi et al. | |
| 6,504,614 B1 | * | 1/2003 | Messerschmidt | G01J 3/453 356/455 |
| 6,999,183 B2 | | 2/2006 | Nielsen et al. | |
| 7,027,639 B2 | | 4/2006 | Fishbaine | |
| 7,477,401 B2 | | 1/2009 | Marx et al. | |
| 8,253,935 B2 | | 8/2012 | Hariyama et al. | |

(Continued)

FOREIGN PATENT DOCUMENTS

| | | |
|---|---|---|
| EP | 0198655 | 10/1986 |
| GB | 2204947 | 11/1988 |

(Continued)

OTHER PUBLICATIONS

ISA/KR, International Search Report for PCT/US2016/052714 dated Dec. 8, 2016.

*Primary Examiner* — Tarifur Chowdhury
*Assistant Examiner* — Md M Rahman
(74) *Attorney, Agent, or Firm* — Hodgson Russ LLP (57) ABSTRACT

A system includes a first beam splitter, a second beam splitter, and a mirror. The second beam splitter can produce two lines of light, which are received by at least one sensor. The two lines of light have different focal heights on the wafer. A distance between the second beam splitter and the mirror can be configured to change a focal height on the wafer. A height of an illuminated region on a surface of the wafer relative to a normal surface of the wafer can be determined using the two lines of light.

16 Claims, 3 Drawing Sheets

(56) References Cited

U.S. PATENT DOCUMENTS

| | | |
|---|---|---|
| 9,097,645 B2 | 8/2015 | Cai et al. |
| 2002/0104973 A1* | 8/2002 | Kerekes .............. B29C 67/0059 250/559.2 |
| 2003/0132401 A1 | 7/2003 | Yamada et al. |
| 2003/0169423 A1 | 9/2003 | Finarov et al. |
| 2014/0071457 A1 | 3/2014 | Cal et al. |
| 2014/0291517 A1 | 10/2014 | Wang et al. |
| 2014/0339425 A1* | 11/2014 | Yano ...................... G01B 15/00 250/307 |
| 2015/0109623 A1* | 4/2015 | Abdulhalm ........ G01B 9/02004 356/479 |
| 2016/0178514 A1 | 6/2016 | Li et al. |
| 2016/0377412 A1 | 12/2016 | Li et al. |
| 2017/0067732 A1 | 3/2017 | Li et al. |

FOREIGN PATENT DOCUMENTS

| | | |
|---|---|---|
| JP | 2002022415 | 1/2002 |
| JP | 2005106797 | 4/2005 |
| JP | 2012093197 | 5/2012 |

\* cited by examiner

INCREASING DYNAMIC RANGE OF A HEIGHT SENSOR FOR INSPECTION AND METROLOGY

CROSS-REFERENCE TO RELATED APPLICATIONS

This application claims priority to the provisional patent application filed Sep. 21, 2015 and assigned U.S. App. No. 62/221,596, the disclosure of which is hereby incorporated by reference.

FIELD OF THE DISCLOSURE

This disclosure relates to semiconductor wafer inspection and metrology.

BACKGROUND OF THE DISCLOSURE

The semiconductor industry requires three-dimensional ("3D") inspection and/or metrology processes for silicon wafers. Structure or particle height inspection and metrology can be used to test, for example, pillar and bump structure in mid-end-of-line (MEOL) applications or the particle shape (e.g., size and height) on a backside of wafers for extreme ultraviolet (EUV) lithograph applications. Typical techniques for inspection or metrology include: (1) triangulation; (2) geometric shadow; (3) various confocal microscope techniques; and (4) white-light (or broadband light) interferometry. Existing triangulation and geometric shadow techniques typically do not provide required accuracy and precision for MEOL or back-end-of-line (BEOL) applications, especially as the characteristic size of the structures becomes smaller. For example, existing triangulation and geometric shadow techniques can lack the required accuracy and precision for 3D inspection when the target structure height shrinks below 10 µm. Confocal and interferometry methods often do not provide required throughput or are too expensive for 3D inspection in MEOL and BEOL. Therefore, what is needed is a more cost-effective inspection and metrology technique that can provide better accuracy for small structures.

BRIEF SUMMARY OF THE DISCLOSURE

In a first embodiment, a system is provided. The system comprises a light source configured to provide light; a stage configured to hold a wafer to receive the light from the light source; a first beam splitter disposed in a path of the light from the light source; a complementary plate disposed in a path of the light reflected from the wafer through the first beam splitter; a second beam splitter disposed in a path of the light from the first beam splitter and the complementary plate; at least one sensor; and a mirror disposed in a path of light between the second beam splitter and the sensor. The sensor receives the two lines of light. A distance between the second beam splitter and the mirror is configured to change a focal height on the wafer. The second beam splitter is configured to produce two lines of light. The two lines of light have different focal heights on the wafer.

A distance of a path of light between the second beam splitter and the mirror can be 1 mm or less.

The complementary plate can be fabricated of the same material and can have the same thickness as the beam splitter.

The complementary plate can be positioned at an angle opposite that of the beam splitter relative to an axis of the light.

The system can further include a processor in electrical communication with the sensor. The processor can be configured to determine a height of an illuminated region on a surface of the wafer relative to a normal surface of the wafer. The processor can be configured to determine the height using respective heights of the two lines of light and a focal point offset of the two lines of light. The processor can determine whether the light reflected from the wafer is under-focused or over-focused.

The sensor can be a photodiode array.

The stage can be configured to scan the wafer relative to the light from the light source.

The light that is projected onto the wafer can be configured to be shaped into a line.

The system can further include a slit configured to shape the light.

The at least one sensor can include two sensors. The two sensors can each receive one of the two lines of light, respectively. Each of the two sensors can be a photodiode array.

In a second embodiment, a method is provided. The method comprises reflecting light off a first beam splitter; reflecting the light off a surface of a wafer; passing the light through the first beam splitter and a complementary plate; passing the light from the complementary plate through a second beam splitter; producing two lines of light with the second beam splitter; reflecting one of the two lines of light from the second beam splitter with a mirror; and receiving each of the two lines of light with at least one sensor. The two lines of light have different focal heights on the wafer.

The method can further include determining, using a processor in electronic communication with the sensor, a height of an illuminated region on a surface of the wafer relative to a normal surface of the wafer using the two lines of light. Determining the height can include using respective heights of the two lines of light and a focal point offset of the two lines of light.

The method can further include adjusting a distance between the second beam splitter and the mirror thereby changing focal heights on the wafer.

The method can further include determining whether the light is under-focused or over-focused using a reading from the sensor.

The method can further include shaping the light projected onto the wafer into a line.

Each of the two lines of light can be received by one of a plurality of the sensors.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

The system and techniques disclosed herein provide a variable and large dynamic range and provide a fast and cost-effective solution for structure height inspection and metrology in, for example, the MEOL or BEOL space. Embodiments, as disclosed herein, can be combined with a height sensor to determine height of a structure on a wafer. Thus, embodiments of the system and method disclosed herein can be used for semiconductor height inspection and metrology. This system can provide a fast and cost-effective solution for structure height inspection and metrology with a large dynamic range and high sensitivity.

Figure 1:
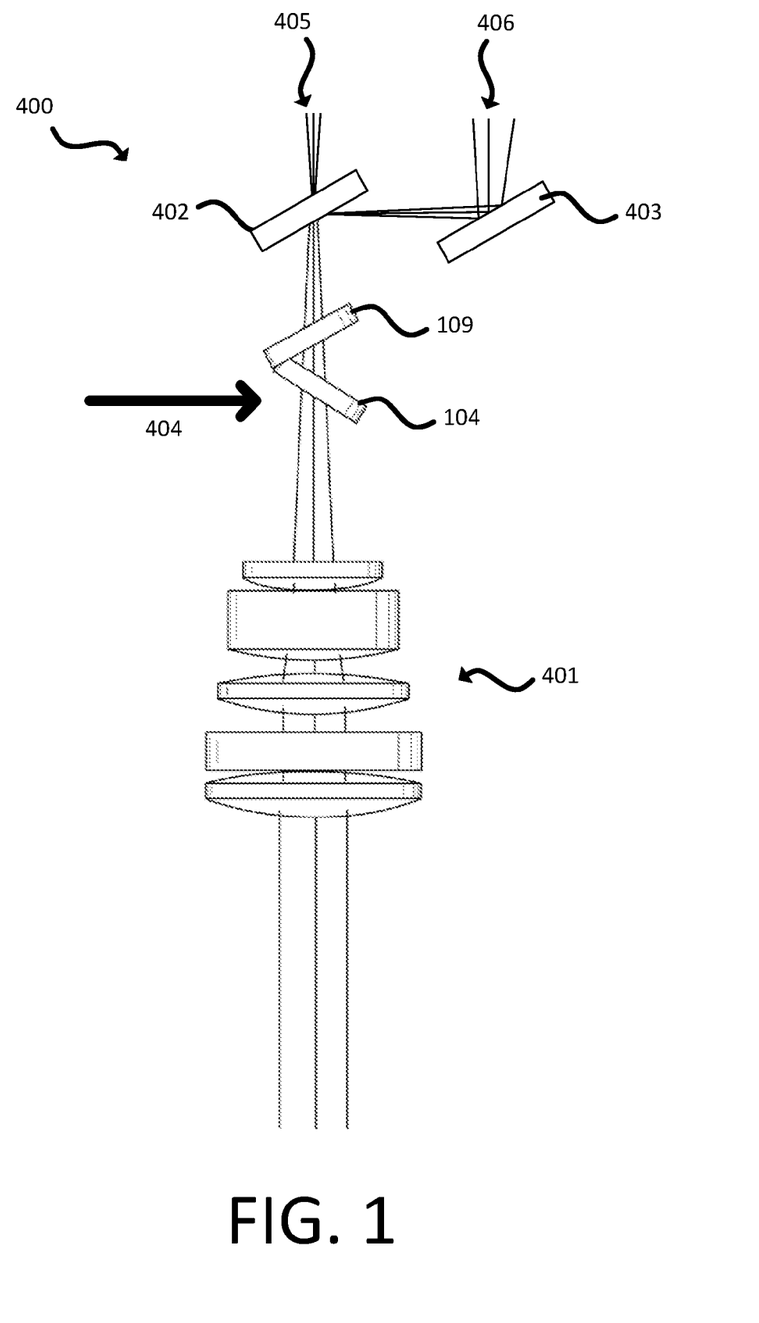
FIG. 1 is an embodiment of two beam splitters in accordance with the present disclosure.

An exemplary implementation of a system 400 that increases the dynamic range is shown in FIG. 1. In FIG. 1, the original beam is split into two partial beams, one passing the second beam splitter 402 and the other being redirected by a mirror 403. Both beams pass through the downstream optics and form two separated lines on one or more sensors. These two lines can be the first line 405 and second line 406 in FIG. 1.

A first beam splitter 104 receives light from a light source (represented by the arrow 404). Some light passes through the relay lens 401 to a wafer (not illustrated). Light reflected off the wafer passes through the relay lens 401 to the first beam splitter 104 and the complementary plate 109. The light projected at and reflecting off the wafer also can pass through an objective lens or other lenses. While illustrated as overlapping, the complementary plate 109 and the first beam splitter 104 may be separated from one another or may abut one another.

The complementary plate 109 can be fabricated of the same material and can have the same thickness as the first beam splitter 104. The thicknesses of the complementary plate 109 and the first beam splitter 104 may be the same to the tolerance of 0.1 mm, 0.01 mm, or 0.001 mm. For example, the complementary plate 109 can be fabricated of an optical glass configured to transmit light in an application wavelength range. A typical thickness for the complementary plate 109 may be in a range from approximately 1 mm to 3 mm, including all values to the 0.1 mm therebetween. In an instance, both the complementary plate 109 and the first beam splitter 104 have thicknesses of 2 mm. The relative thicknesses of the complementary plate 109 and the first beam splitter 104 can be a function of the numerical aperture (NA) at the beam splitter to complementary plate space or of the magnification from the wafer.

The complementary plate 109 can be set at the same angle as the first beam splitter 104. Typically, the angle of the complementary plate 109 is set to be 45° relative to the path of the incoming light (e.g., arrow 404), though other angles are possible. The first beam splitter 104 also may be set at 45°, though the complementary plate 109 and first beam splitter 104 may be oppositely arranged across an imaginary axis or the path of the incoming light. In an instance, there is a 90° angle between surfaces of the complementary plate 109 and first beam splitter 104. The design tolerance of the angle of the complementary plate 109 and first beam splitter 104 may be near zero.

For some design considerations, the angle of the complementary plate 109 can be different from 45°. For example, the complementary plate 109 can be set to an angle that is not 45° to provide a feasible thickness that reaches the desired astigmatism or to fit the complementary plate 109 among the other components in the system.

In one embodiment, the complementary plate 109 can be different in material, thickness, and/or angle than the first beam splitter, but can still be designed to provide the desired performance.

In an instance, the first beam splitter 104 and the complementary plate 109 can be packaged in the same subassembly.

The relay lens 401 in FIG. 1 can deflect the rays from a point on the wafer to a focus or image point. For example, the relay lens 401 can deflect the rays to the top converging point in FIG. 1. The relay lens 401 can include one or more lenses. There also can be other optics configured to manipulate the rays before the rays reach the relay lens 401, which are not shown in FIG. 1.

Without the complementary plate 109, both chromatic aberration and astigmatism can be significant in the system 400. The astigmatism can be used to optimize lateral resolution and sensitivity simultaneously, but the chromatic aberration in the first beam splitter 104 and second beam splitter 402 needs to be removed or balanced to ensure system accuracy. The complementary plate 109 can introduce desired astigmatism and remove chromatic aberration. For example, chromatic aberration of the first beam splitter 104 and second beam splitter 402 can be balanced using the complementary plate 109. The astigmatism can provide a way to design a system with high lateral resolution (by focusing along the slit) and maximum sensitivity (by defocusing perpendicularly to the slit so it seats on a maximum slope point). Beam splitters in the finite conjugated system can cause chromatic and astigmatism aberration that can lower performance. For example, without the complementary plate 109, the maximum lateral resolution point for an ultra-thin beam splitter is at focus where the sensitivity is exactly zero. If the work point is set at the slope of a focus curve (e.g., is defocused to get acceptable sensitivity), then the lateral resolution will be lower by at least a factor of two. The light of the second line 406 passes through the second beam splitter 402. The area that the light of the second line 406 passes through on the second beam splitter 402 can be coated to provide maximum transmission.

In another example, if the first beam splitter 104 and second beam splitter 402 have the same thickness, have the same angle, and are made of the same material, the need for a complementary plate 109 may be reduced.

In an instance, total removal of chromatic aberration occurs using the complementary plate. In another example, near-total removal of the chromatic aberration occurs using the complementary plate. For example, 0.1% or less of the chromatic aberration may remain and the complementary plate may be configured to remove at least 99.9% of the chromatic aberration that would be present without the complementary plate.

The second beam splitter 402 forms the first line 405 and the second line 406. For example, half the photons that pass through the complementary plate 109 are formed in the second line 406 by the second beam splitter 402. The light from the second line 406 passes through the second beam splitter 402. The thickness or other parameters of the second beam splitter 402 may be controlled to provide the desired effect. The lower surface of the second beam splitter 402 closest to the wafer and/or complementary plate 109 may be reflective. Part of the second beam splitter 402 may be coated to provide maximum transmission.

The original beam passes the second beam splitter 402 and forms a first line 405 on one or more sensors via downstream optics (not shown). The beam reflected off the second beam splitter 402 propagates to a mirror 403. The mirror 403 re-directs the beam and forms the second line 406, which is projected at another sensor or on a different area of the same sensor as the first line 405.

First line 405 and second line 406 can have different focal heights on wafer. The difference of the focal heights can be adjusted or can be recipe dependent by adjusting the distance between the second beam splitter 402 and the mirror 403. With the system 400, the first line 405 can be set to focus on a surface of the wafer and the second line 406 can be set to focus on a top of a pillar or other feature on the surface of the wafer. In this configuration, a normal height difference between the wafer surface and the pillar or other feature is offset by the focus difference between first line 405 and second line 406. The variation of the wafer around its normal surface height can be measured by the first line 405, and the pillar or other feature height variation around its normal can be measured by the second line 406. Since the variation around normal is much smaller and typically within the depth of focus (DOF) of the system, embodiments of this technique can lead to increased dynamic range.

The mirror 403 can be used to position the relative focus point of the first line 405 and the second line 406 on the wafer. For example, the first line 405 can be positioned at a point on a wafer with a normal height and the second line 406 can be positioned on a bump or other feature located on the wafer. A recipe can be used to position the mirror 403 for a particular height or an expected height on the wafer. For example, a user may have or may know an expected height difference between the bump and the wafer surface that the position of the mirror 403 may be set to.

For example, when a pillar height needs to be measured relative to a wafer surface, there may be more than 100 µm height difference. This can be larger than the DOF of the system. To provide improved performance, the mirror position can be set at a position that the focal point of the first line 405 is different from the second line 406 by 100 µm via a recipe setup. Points on the first line 405 that focus sharply on a wafer surface along the line direction can be analyzed to find the height by measuring the width perpendicular to the line of those points. Similarly, points on the second line 406 that focus sharply on top of pillars are analyzed to find the height of pillars. The final height difference between wafer surface and pillar top is calculated from the height of the first line 405, the height of the second line 406, and the focal point offset of the first line 405 and the second line 406.

The distance between the second beam splitter 402 and the mirror 403 may be related to the system NA. In an example, a distance of a path of light between the second beam splitter 402 and the mirror 403 is approximately 1 mm or less, including all values and ranges to the 0.01 mm therebetween. In another example, the path of light between the second beam splitter 402 and the mirror 403 is greater than 1 mm.

While discussed herein as a first line 405 and second line 406, the light reflected from the wafer can be a single line of photons. An objective lens or some other lens system can focus the light as a line on the wafer.

In a particular embodiment, the first beam splitter 104 may have a thickness of 2.5 mm, the complementary plate 109 may have a thickness of 1.5 mm, the second beam splitter 402 may have a thickness of 1 mm, and the mirror 403 may have a thickness of 0.5 mm. Other thicknesses or dimensions are possible.

Figure 2:
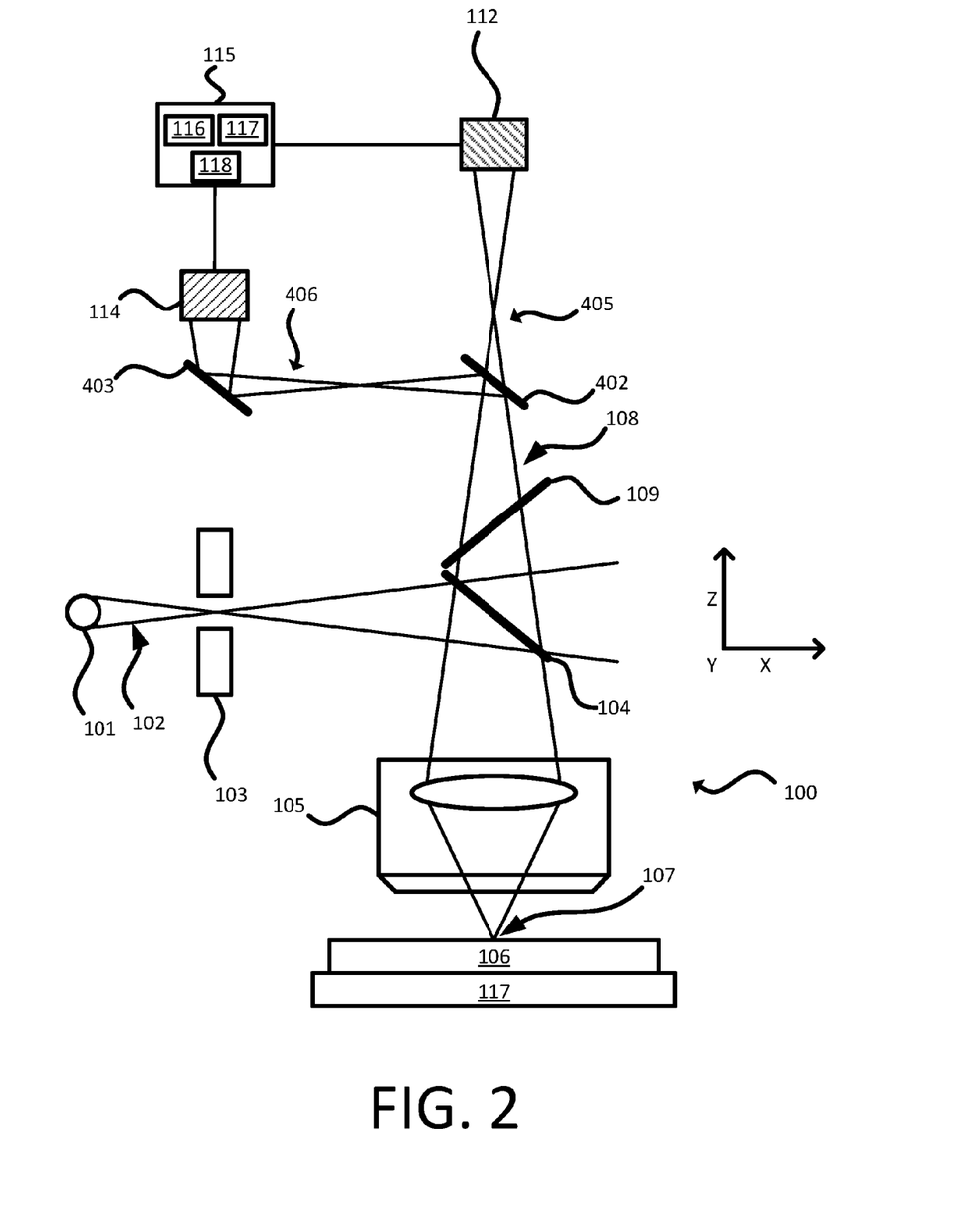
FIG. 2 is an embodiment in accordance with the present disclosure.

The system 400 can be used in the system 100 shown in FIG. 2. Other systems besides that of FIG. 2 also can benefit from use of a second beam splitter and mirror as described in the system 400.

The complementary plate 109, second beam splitter 402, and mirror 403 can be positioned in the beam downstream from the pin-hole or slit shown in FIG. 2. The exact location of the complementary plate 109 can vary, though it typically is in the range as shown in FIG. 1. However, the complementary plate 109 may not be too close to the focal point to avoid light scattering or wave front deformation by defects on the beam splitter(s) or complementary plate. The position of the complementary plate 109, second beam splitter 402, and mirror 403 also can vary based on their physical dimensions and size so that each can be placed in the system. In an instance, the second beam splitter 402 and mirror 403 may be before the focal point. The focal point of the first line 405 may be proximate to the photodiode 112.

The system 100 in FIG. 2 has a light source 101 that is configured to provide light 102 having a spectrum of wavelength range. In some embodiments, the light source 101 may be configured to provide white light (i.e., broadband light in the visible spectrum) or light that is partially or completely outside of the visible spectrum. In an exemplary embodiment, the light 102 provided by the light source 101 includes wavelengths (λ) from 400-800 nm. The photodiode array 114 can be moved if the position of the mirror 403 is adjusted. An optical system also can provide the light to a fixed photodiode array 114 if the position of the mirror 403 is adjusted. An optical system also can provide the light to adjustable photodiode arrays 112, 114 with a fixed mirror 403. The photodiode arrays 112, 114 can be moved in the optical axis direction (e.g., the z-direction) or in other directions. While illustrated as two photodiode arrays 112, 114, a single photodiode array can be used. For example, a two-dimensional complementary metal-oxide-semiconductor (CMOS) or charge-coupled device (CCD) array can be used and the first line 405 and second line 406 will emerge to different areas of the two-dimensional array. In this example, the second line 406 can pass a different part of the second beam splitter 402 where maximum transmission occurs. The mirror 403 may be adjustable with a single two-dimensional array that receives both the first line 405 and second line 406.

A laser light source can be used for the light source 101, which can provide a higher brightness compared to a conventional incoherent light source, such as those used for white light interferometry and chromatic confocal microscopy. Laser light sources, such as diode lasers, can improve lifetime, stability, and thermal control of the light source. The light source 101 may be, for example, a visible diode laser.

The light 102 is projected toward a source slit 103 and a first beam splitter 104, which splits the light 102 into two quantities as seen in FIG. 2. The light 102 is then projected through an objective lens 105, which may be a high magnification objective lens. The objective lens can be configured to illuminate the wafer with light from the light source 101 and collect light reflected from the wafer 106. Some or all of the light 102 passes through the objective lens 105 onto at least a portion of a sample at an illumination line 107. The sample may be, for example, a wafer 106. The width of the light 102 at the illumination line 107 may be diffraction limited.

The wafer 106 is disposed on a stage 117 configured to hold the wafer 106 to receive the light 102. The stage 117 can be fixed or can scan in the x-direction, y-direction, and/or z-direction. The wafer 106 may be clamped to the stage 117 in an instance, such as through mechanical and/or electrostatic clamping. For example, the stage 117 can translate the wafer 106 in a plane perpendicular to the axis of the light 102 or the objective lens 105 (e.g., the x-y plane).

Reflected light 108 passes through the first beam splitter 104 and complementary plate 109 to a second beam splitter 402. Some of the light then passes from the second beam splitter 402 to a first photodiode array 112 while some of the light then emerges from the second beam splitter 402 to a mirror 403 and a second photodiode 114 array. While illustrated as separate, the first photodiode array 112 and second photodiode array 114 may be part of the same two-dimensional array. The first line 405 and second line 406 can be directed at different parts of the two-dimensional array.

The system 100 can distinguish whether the detected feature on the wafer 106 is above or below the normal surface of the wafer 106 according to the line width or other line dimension of the first line 405 and second line 406 when detected by the photodiode arrays 112, 114. Which of the photodiode arrays 112, 114 receives the image line formed by light reflected from a sample can be used to determine if the reflected light 108 is under-focused or over-focused by analyzing the width or other dimension of the line. For example, if the photodiode arrays 112, 114 do not receive a normal line width of the reflected light 108 for the wafer surface, then it can be determined that the detected feature on the wafer 106 is above or below the normal surface of the wafer 106.

The beam splitters 104 and 402 in the finite conjugated system 100 can cause chromatic and astigmatism aberration that can lower performance. Furthermore, the trade-off of focus offset and lateral resolution when implemented in a line scan scheme can provide a limited lateral resolution. The astigmatism can come from the rays that fan out in the plane of FIG. 2 having a different incident angle on the finite glass plate of the first beam splitter 104 and, thus, a different Optical Path Difference (ODP) than that of the rays that fan out perpendicular to the plane. Thus, the rays that fan out in the plane have a different focal point from the rays that fan out perpendicular to the plane. This astigmatism can provide an advantage in a line scan layout, where the points along the line are in focus along the line direction to provide lateral resolution and are out of focus perpendicular to the scanning line that can provide maximum sensitivity to height on the wafer 106. However, this astigmatism magnitude may be a function of refractive index of the first beam splitter 104 and a function of wavelength of light source 101. This chromatic behavior can prevent the effectiveness of this technique.

To address the chromatic issue, a complementary plate 109 is provided. Reflected light 108 from the wafer 106 is projected through the objective lens 105 and the complementary plate 109. For example, if the complementary plate 109 has the same thickness and material as first beam splitter 104, and is set at the same tilt angle at an opposite sign as shown in FIG. 2, a ray trace analysis shows that the chromatic behavior of the complementary plate 109 cancels out with the first beam splitter 104, and the desired astigmatism is preserved. Other configurations for the complementary plate 109 are possible.

The height difference between a top of a pillar or other feature to a surface of a wafer may be so large that the illumination line cannot be on focus simultaneously. In such case, an optical ladder using the second beam splitter 402 and mirror 403, as seen in FIG. 1, can apply to the illumination path in FIG. 2. For example, the illumination path for the system of FIG. 2 can be in the space between the source slit 103 and first beam splitter 104 in FIG. 1. Thus, two illumination lines can be generated on the wafer 106. One of these illuminations lines focuses on the top of the pillar or other feature and another on a surface of the wafer 106. These two illumination lines can be detected by the two photodiode arrays 112, 114 simultaneously.

In another instance, a two-dimensional array can be used without a slit. The two-dimensional array may have more pixels along the illumination line direction for high lateral resolution along the slit, and fewer pixels perpendicular to the illumination line direction. For example, 10 pixels may be used. The intensity distribution along these pixels (e.g., 10 pixels) can provide the measurement of the height of a point on wafer. Other operation modes are possible.

It may not be necessary to use a differential detection mode because the astigmatism fans out as a ray from one point onto multiple pixels perpendicular to the slit and the height of the feature relative to the wafer surface can be calculated from the intensity distribution along these pixels. Instead, one two-dimensional sensor array without a slit can determine a height of an illuminated region of a wafer surface when the astigmatism technique disclosed herein is used.

Some or all of the sensors disclosed in FIG. 2 (e.g., photodiodes, bi-cell photodiodes, photodiode arrays, CMOS, or CCD) can be electronically connected to a controller 115. The controller 115 can include a processor 116, an electronic data storage unit 117 in electronic communication with the processor 116, and a communication port 118 in electronic communication with the processor 116. The processor 116 can receive readings from the sensors in any suitable manner (e.g., via one or more transmission media, which may include "wired" and/or "wireless" transmission media) such that the controller 115 can receive the output generated by the sensors. The controller 115 may be configured to perform a number of functions using the output. Using the readings from the sensors, the processor 116 can be configured to determine a height of an illuminated region of the wafer surface (e.g., point or line) or whether a defect is present on or in the wafer surface. In another example, the controller 115 may be configured to send the output to an electronic data storage unit 117 or another storage medium without performing defect review on the output. The controller 115 may be further configured as described herein.

It is to be appreciated that the controller 115 may be implemented in practice by any combination of hardware, software, and firmware. Also, its functions as described herein may be performed by one unit, or divided up among different components, each of which may be implemented in turn by any combination of hardware, software, and firmware. Program code or instructions for the controller 115 to implement the various methods and functions described herein may be stored in controller readable storage media, such as a memory in the electronic data storage unit 117, within the controller 115, external to the controller 115, or combinations thereof.

An additional embodiment relates to a non-transitory computer-readable medium storing program instructions executable on a controller for performing a computer-implemented method for determining a height of an illuminated region on a surface of a wafer, as disclosed herein. In particular, as shown in FIG. 2, electronic data storage unit 117 or other storage medium may contain non-transitory computer-readable medium that includes program instructions executable on the controller 115. The computer-implemented method may include any step(s) of any method(s) described herein.

Program instructions implementing methods such as those described herein may be stored on computer-readable medium, such as in the electronic data storage unit 117 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

While not illustrated in FIG. 2, the system 100 can include a relay lens, such as the relay lens 401 of FIG. 1.

Figure 3:
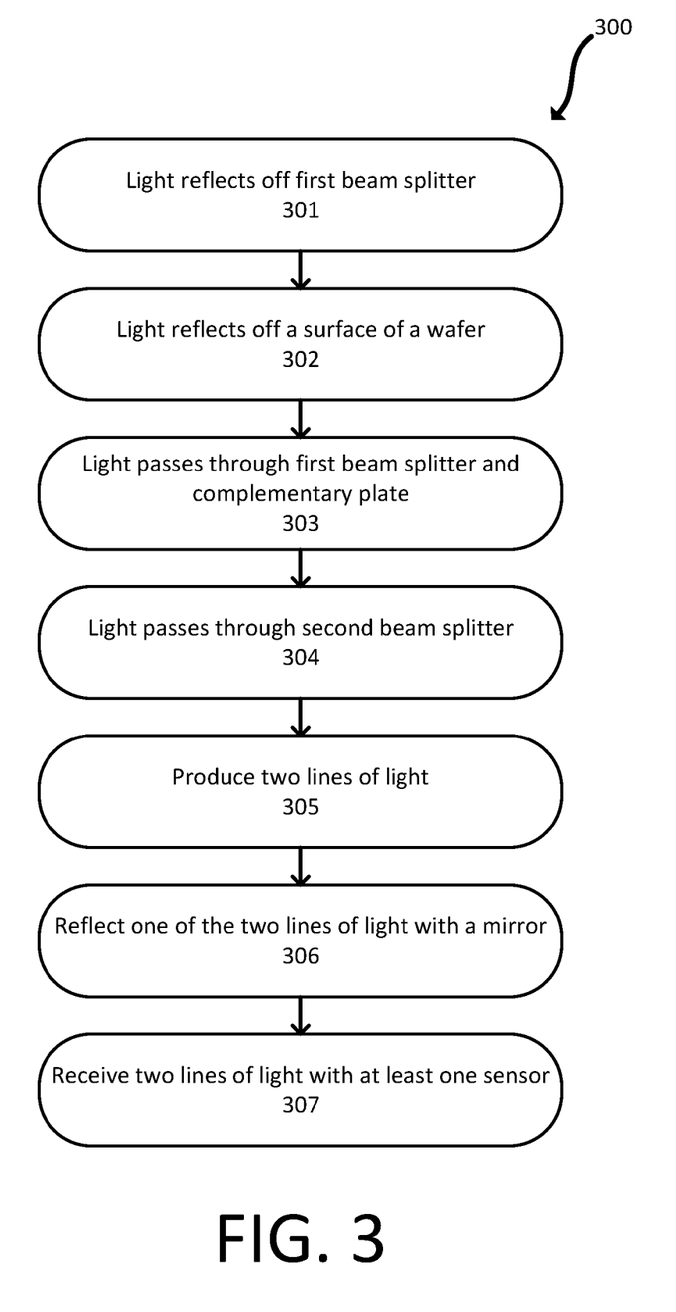
FIG. 3 is a flowchart in accordance with the present disclosure.

FIG. 3 is a flowchart of a method. In method 300, light is reflected off a first beam splitter 301. The light is reflected off a surface of a wafer 302. Light reflected off the surface of the wafer passes through the first beam splitter and a complementary plate 303. Light that passes through the first beam splitter and the complementary plate passes through a second beam splitter 304. Two lines of light are produced with the second beam splitter 305. One of these two lines of light is reflected with a mirror 306. The two lines of light are received with at least one sensor 307. For example, there can be two sensors and each of the two sensors can receive one of the two lines of light, respectively. The two lines of light have different focal heights on the wafer.

The wafer may scan relative to the light in the x-direction and/or y-direction using the stage in the embodiments disclosed herein. This can provide surface topography information for an area of the surface of the wafer. This area may be, for example, a patch image, a full wafer inspection, or desired points as a bump-height inspection.

It should be noted that embodiments disclosed herein may determine a surface height profile of a wafer without scanning in the z-direction, although the stage may be capable of movement in the z-direction for other purposes.

Embodiments of the systems disclosed herein may need to be calibrated. Calibration can include determining the relationship of the line width on a sensor to a known height difference. The position of the adjustable mirror may be calibrated by scanning the wafer position in the z-direction to get a desired line width on a sensor for a series of adjustable mirror positions.

Power to the laser light source can be controlled, such as through modulating or pulsing, which can enable strobing. In an instance, during operation of embodiments disclosed herein, the optics can be kept steady or otherwise fixed and the wafer can move in a direction perpendicular to the illumination line in synchronization with a light sensor's readout timer. Strobe technology, such as that caused by modulating the laser and synchronizing the laser with the sensor readout, can provide further spatial improvement because strobing can reduce blurring due to motion of a stage, such as the stage 117.

Embodiments of the systems disclosed herein can be used for inspection or metrology of a wafer. A height of the wafer surface or whether defects are present on or in the wafer surface can be used as feedback during semiconductor manufacturing.

Multiple design parameters of embodiments of the systems disclosed herein can be optimized. For example, height sensitivity, which relates to the change of line width on a sensor versus focus, is inversely proportional to the square of the objective NA. The relatively high NA may be adjusted, though many applications require an NA of greater than 0.25. A high NA objective typically provides a smaller field of view, which results in higher spatial (x- and y-) resolution and slower operation.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a light source configured to provide light;
a stage configured to hold a wafer to receive the light from the light source;
a first beam splitter disposed in a path of the light from the light source;
a complementary plate disposed in a path of the light reflected from the wafer through the first beam splitter;
a second beam splitter disposed in a path of the light from the first beam splitter and the complementary plate, wherein the second beam splitter is configured to produce two lines of light, and wherein the two lines of light have different focal heights on the wafer;
at least one sensor, wherein the sensor receives the two lines of light;
a mirror disposed in a path of light between the second beam splitter and the sensor, wherein a distance between the second beam splitter and the mirror is configured to change a focal height on the wafer; and
a processor in electrical communication with the sensor, wherein the processor is configured to determine a height of an illuminated region on a surface of the wafer relative to a normal surface of the wafer, wherein the processor is configured to determine the height using respective heights of the two lines of light and a focal point offset of the two lines of light, wherein the processor is configured to determine whether the illuminated region on the surface is below the normal surface based on a dimension of the two lines of light, and wherein the processor is configured to determine whether the illuminated region on the surface is above the normal surface based on the dimension of the two lines of light.

2. The system of claim 1, wherein a distance of a path of light between the second beam splitter and the mirror is 1 mm or less.

3. The system of claim 1, wherein the complementary plate is fabricated of a same material and has a same thickness as the beam splitter.

4. The system of claim 1, wherein the complementary plate is positioned at an angle opposite that of the beam splitter relative to an axis of the light.

5. The system of claim 1, wherein the processor is configured to determine whether the light reflected from the wafer is under-focused or over-focused.

6. The system of claim 1, wherein the sensor is a photodiode array.

7. The system of claim 1, wherein the stage is configured to scan the wafer relative to the light from the light source.

8. The system of claim 1, wherein the light projected onto the wafer is configured to be shaped into a line.

9. The system of claim 1, further comprising a slit configured to shape the light.

10. The system of claim 1, wherein the at least one sensor includes two sensors, and wherein the two sensors each receive one of the two lines of light, respectively.

11. The system of claim 10, wherein each of the two sensors is a photodiode array.

12. A method comprising:
reflecting light off a first beam splitter;
reflecting the light off a surface of a wafer;
passing the light through the first beam splitter and a complementary plate;
passing the light from the complementary plate through a second beam splitter;
producing two lines of light with the second beam splitter;
reflecting one of the two lines of light from the second beam splitter with a mirror;
receiving each of the two lines of light with at least one sensor, wherein the two lines of light have different focal heights on the wafer;
determining, using a processor in electronic communication with the sensor, a height of an illuminated region on a surface of the wafer relative to a normal surface of the wafer using the two lines of light, wherein the determining the height includes using respective heights of the two lines of light and a focal point offset of the two lines of light;
determining, using the processor, whether the illuminated region on the surface is below the normal surface based on a dimension of the two lines of light; and
determining, using the processor, whether the illuminated region on the surface is above the normal surface based on the dimension of the two lines of light.

13. The method of claim 12, further comprising adjusting a distance between the second beam splitter and the mirror thereby changing focal heights on the wafer.

14. The method of claim 12, further comprising determining whether the light is under-focused or over-focused using a reading from the sensor.

15. The method of claim 12, further comprising shaping the light projected onto the wafer into a line.

16. The method of claim 12, wherein each of the two lines of light is received by one of a plurality of the sensors.

* * * * *